Oct. 6, 1964   C. L. BROWN   3,151,530
POWER BRAKE ACTUATOR
Filed Oct. 9, 1962
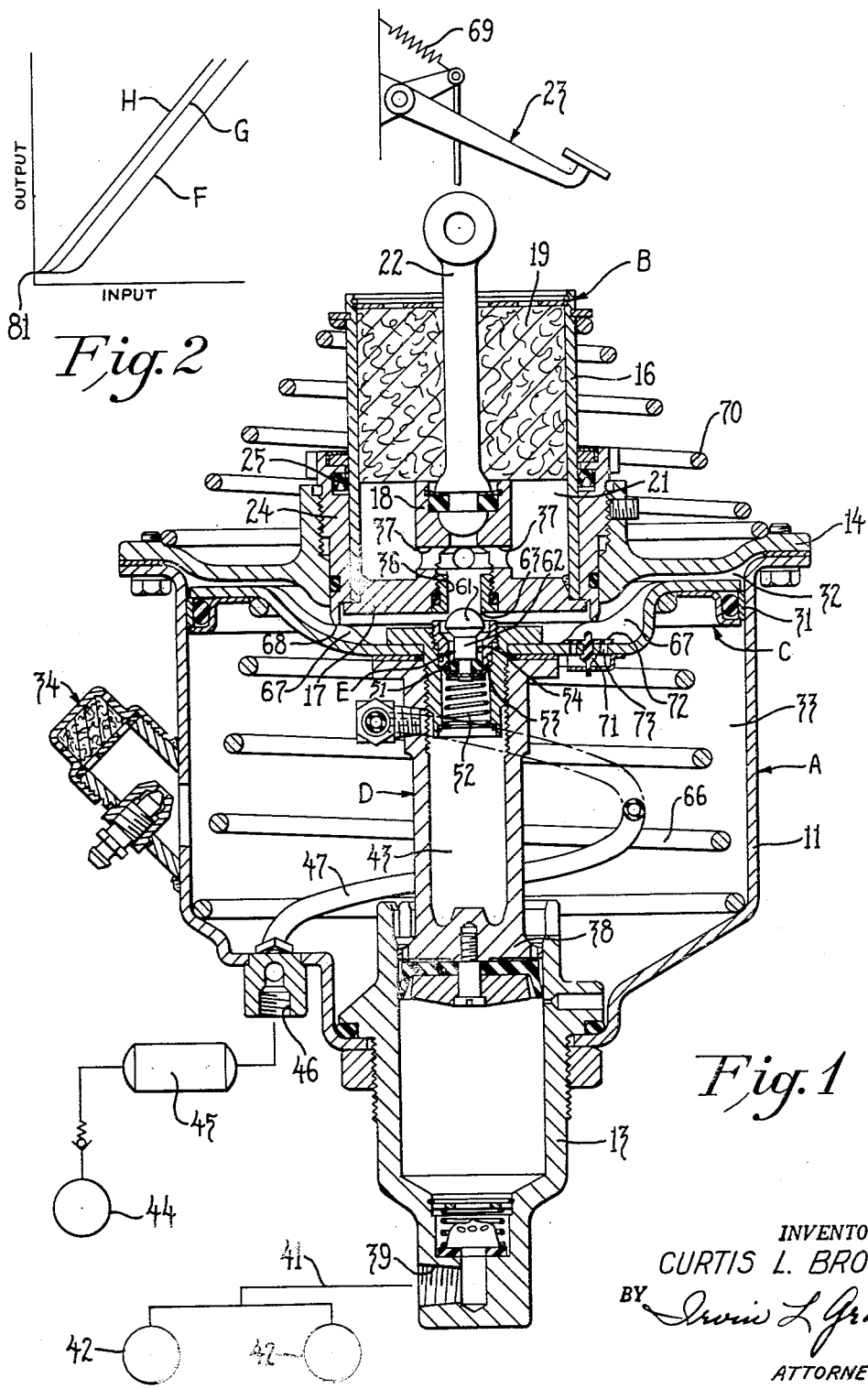
INVENTOR.
CURTIS L. BROWN
BY Irwin L. Groh
ATTORNEY.

United States Patent Office 3,151,530
Patented Oct. 6, 1964

3,151,530
POWER BRAKE ACTUATOR
Curtis L. Brown, Owosso, Mich., assignor to Midland-Ross Corporation, Cleveland, Ohio, a corporation of Ohio
Filed Oct. 9, 1962, Ser. No. 229,446
8 Claims. (Cl. 91—372)

This invention relates to fluid pressure actuating devices and, more particularly, to such devices which are adapted to afford increased and accurately controlled braking pressures in conventional hydraulic brake systems for vehicles.

One of the important requirements of such actuators or power brake units is that a vehicle operator should be able to sense or "feel" the degree of braking effort produced by the power brake unit. The feel characteristics must be accurate throughout the entire range of braking, not only during application but also during release of the brakes. This requires an arrangement in which pedal effort is made directly and accurately proportional to power output with a minimum of moving parts and seals which cause undesirable frictional resistance. Such friction is not always predictable and varies at different points in the range of braking so that a constant ratio of manual input to brake output cannot be predicted or maintained. Furthermore, the friction of the unit must be taken into account so that it can be overcome by the initial manual pedal effort which increases the effort requirements to initiate braking.

Many of the present commercial units which attempt to produce "feel" do so with a complicated arrangement of levers, springs, seals and pressure chambers which not only result in friction but also result in a unit of enlarged size. This is particularly undesirable and often makes the unit commercially unacceptable for automobile brakes because of the limited space available in the area where the brake booster must be mounted.

It is a general object of the invention to provide a brake booster in which the manual input effort is directly proportional to the output or braking force during both application and release of the brakes.

It is another object of the invention to provide a brake booster in which all of the manual effort is used solely for actuating the valve and application of the brakes results entirely from the force of the power unit.

Another object of the invention is to provide a brake booster in which a common pressure chamber acts on both an output and the manual input member to produce an accurate "feel" or reaction to the braking force.

A further object of the invention is to provide a brake booster which avoids mechanical connections between the manual input member and the power output member so that the effect of friction on the relationship between the two members is minimized.

Still another object of the invention is to provide a brake booster in which the number of seals between relatively moving parts is minimized thereby keeping the effects of friction to a minimum.

An additional object of the invention is to provide a brake booster in which the entire area of the power piston as defined by its largest diameter is affected by pressure to make it possible to minimize the size of the power unit.

These and other objects and advantages will become apparent from the following description and the drawings disclosing a preferred embodiment of the invention. Referring to the drawings:

FIGURE 1 is a cross-sectional view of a power brake unit embodying the present invention with some of the associated mechanism illustrated schematically; and FIGURE 2 is a graph illustrating operating characteristics of power brake units.

The details of construction of power brake units take many forms but all include the same essential components, namely, a fluid pressure tight housing A, a manual input member B, a power operated member C, an output member D and a so-called "follow up" valve mechanism E. In operation, movement of the input member B causes actuation of the follow up valve mechanism E to permit a pressure differential to act on the power member C which results in its movement and that of the output member D to produce actuation of the brakes.

Referring to the present embodiment of the invention, the housing A is in the form of a cylindrical shell 11 which is enclosed at its lower end by a hydraulic master cylinder 13 and at its upper end by a cover 14. Both the cover 14 and master cylinder are connected in sealing relation to the shell 11 to form a fluid tight housing. Although the master cylinder is shown in a vertical position, it can be considered as operating in a conventional manner and a detailed description is not considered to be necessary for a full understanding of the invention.

The manual input member B comprises a cylindrical piston 16 closed at its lower end by a rigidly attached piston head 17 having a stem 18. An air filter 19 is connected at the upper end of the piston 16 to permit the free passage of air to a chamber 21 in the interior of the piston 16. A push rod 22 passes through the center of the filter 19 and its lower end is connected to the stem 18. The upper end of the push rod 22 is adapted for connection to the usual brake pedal linkage 23 which is illustrated schematically. Movement of the pedal linkage 23 and, consequently, the push rod 22 results in sliding movement of the manual input member B relative to a sleeve 24 rigidly connected to and forming a part of the cover 14. A fluid tight seal is provided between the relatively movable input member B and sleeve 24 by a seal 25.

The power operated member C is in the form of a piston or movable wall which is supported for sliding movement in the housing A and is provided with a seal assembly 31 at its outer periphery to engage the internal wall of the housing so that separate fluid pressure chambers 32 and 33 are formed in the housing A above and below the piston C respectively. The chamber 33 is in constant communication with the atmosphere through a breather assembly 34 and chamber 32 is adapted to communicate with the atmosphere by way of an axial passage 36 and radial passages 37 formed in the piston head 17 and stem 18, chamber 21 and the air filter 19.

The output member D is rigidly attached to the power piston C for movement therewith. The lower end of the output member D is closed to form a piston head 38 which operates upon downward movement to displace hydraulic fluid from the master cylinder 13 through outlet 39 and deliver it through lines 41 to conventional hydraulic brake units 42. The output member D is cylindrical in shape with its interior forming a supply chamber 43. The supply chamber 43 is in continuous communication with a supply of fluid pressure delivered by an air compressor 44 to an air reservoir 45. Air pressure from the reservoir 45 is delivered to the port 46 and through a flexible hose 47 to a supply opening communicating with the supply chamber 43.

The follow up valve mechanism E comprises a supply valve element 51 which is normally urged upwardly by a spring 52 into engagement with a supply valve seat 53 formed by the shoulder of a bore 54 which connects with the chamber 32. In its normally closed position, which is illustrated, the supply valve element 51 isolates the supply chamber 43 from the fluid pressure or power chamber 32.

An exhaust valve element 61 is connected to the supply valve element 51 through a stem 62 so that the valve elements 51 and 61 move as a unit. The exhaust valve element 61 is adapted to engage an exhaust valve seat 63 formed at the entrance to the passage 36. In its normal position, the exhaust valve element 61 is separated slightly from its seat 63 as shown in FIGURE 1 to permit passage of atmosphere air from the chamber 21 to the chamber 32 by way of the passages 36 and 37.

In the brake released position shown in FIGURE 1, opposite sides of the piston member C are exposed to equal pressure because chambers 32 and 33 communicate with the atmosphere. In the absence of pressure acting on the piston C, it is biased to its uppermost position by return spring 66 so that radial flanges 67 formed by the piston C contact the annular stop 68 formed by the lower end of the sleeve 24. Supply pressure exists in supply chamber 43 which is isolated from chamber 32 by the supply valve element 51 closed against its seat 53. Under these conditions, no force is being applied to the hydraulic fluid in the master cylinder 13 and the vehicle brakes are in a released position to permit movement of the vehicle.

To actuate the power brake unit and, consequently, the brakes, manual effort from the pedal mechanism 23 is transmitted to the push rod 22 to move the latter downwardly against the slight resistance afforded by the single dynamic seal 25. Initial movement causes the exhaust valve seat 63 to move downwardly and engage the exhaust valve element 61 without disturbing the position of the supply valve element 51 closed on seat 53. This isolates the fluid pressure chamber 32 from the atmospheric pressure chamber 21 in the manual input member B. Under these conditions, the follow up valve mechanism E is in its lap position in which the various chambers 21, 32, 33 and 43 are isolated from each other. Subsequent downward movement of the push rod member 22 is transmitted to the valve mechanism but not to the power piston C and is effective to actuate the power brake unit. When such movement occurs, the exhaust valve element 61 is moved downwardly relative to the stationary piston C by the piston head 17 and, consequently, moves the supply valve element 51 through the stem 62 to permit fluid under pressure from the chamber 43 to pass through the bore 54 into the chamber 32 above the piston C. Since atmospheric pressure exists below the piston C, the resulting pressure differential causes downward movement of the piston C and the output member D which results in displacement of hydraulic fluid from the master cylinder 13. With the exception of the slight force required to overcome the friction of the dynamic seal assembly 31, all of the force produced by pressure acting on piston C is utilized in actuating the hydraulic master cylinder to force hydraulic fluid to the brakes.

To continuously increase the degree of brake application, the supply valve element 51 must be maintained in spaced relation to its seat 53. This is accomplished by continual downward movement of the manual input member B as the piston C moves downwardly. When downward movement of the push rod 22 is stopped, the piston C will continue to move because of the pressure differential until the supply seat 53 comes into engagement with the now stationary supply valve element 51 to isolate the supply chamber 43 and the power chamber 32. This prevents further increase in the pressure in chamber 32 and the piston C will stop moving. The pressure will remain constant in the chamber 32 to maintain the brakes in applied condition. To obtain increased braking force, it is necessary to urge the push rod 22 downwardly an additional amount which repeats the opening of the supply valve element 51 to increase the pressure in the power chamber 32.

The degree of braking force is dependent on the amount of pressure in the power chamber 32. The same pressure is effective on the piston head 17 to urge the manual input member B upwardly. It will be noted that the piston head 17 is effective over its entire area because the passage 36 is closed by the exhaust valve element 61. The upward force on the manual input member B which is a result of the pressure in the power chamber 32 must be overcome by the manual effort of the operator applied to the brake pedal to keep the brakes applied to the selected degree. This creates the sensation of "feel" which is proportional to the pressure on the piston C and, therefore, to the braking effort applied at the wheels. It will be noted that the diameter of the power piston C as defined by the seal assembly 31 is considerably larger than the diameter of the piston 16 as defined by the seal 25. Consequently, there is a considerable difference in the areas of the pistons C and 16 which are affected by the same pressure in the power chamber 32. Therefore, the force moving the manual input member B upwardly is always directly proportional to but substantially less than the force urging the piston C downwardly for any selected pressure in the chamber 32.

After the brakes have been applied the desired degree and are maintained in that position, the supply valve element 51 and exhaust valve element 61 are closed on their respective seats so that the follow-up valve mechanism E again is in its lap position with the various chambers isolated from each other. To release the brakes, manual force must be relieved from the push rod 22. This eliminates the resistance to movement of the input member B so that pressure acting on the piston 17 is effective to cause its upward movement. This in turn causes the seat 63 to separate from the exhaust valve element 61 and open the passages 36, 37 so that air under pressure can exhaust from the fluid pressure chamber 32 to the chamber 21 and through the filter 19 to the atmosphere. As the fluid pressure in the chamber 32 reduces, the piston C moves upwardly due to the pressure in the hydraulic system and the return spring 66 until the piston C contacts the stop 68. At this point, the valve assembly is again in its lap position with both the exhaust and supply valve elements seated. However, the pressure in power chamber 32 is still slightly above atmospheric pressure and, although it is not sufficient to overcome the resistance of spring 66, it is effective to move the manual member B upwardly to its initial position as shown in FIGURE 1. To insure the return of the manual input member B so that the exhaust valve element 61 is unseated, it is common to rely on the return characteristics of the pedal mechanism 23 which normally includes a return spring 69. In the absence of such mechanism, a relatively weak spring 70 may be used between the housing A and input member B to bias the latter upwardly.

If for some reason the source of fluid pressure should be lost so that pressure is not available to actuate and move the power piston C, application of the brakes can be accomplished manually without the assistance of the power piston C by moving the push rod 22 downwardly until the face of the piston head 17 contacts the flanges 67 on the piston C. Thereafter, continued movement of the push rod 22 is effectively transmitted through the piston C to the output member D to displace hydraulic fluid from the master cylinder 13 for manual actuation of the brakes. Such power-off actuation requires an efficient utilization of the manual effort without resistance of the piston C because of pressure in chamber 33. Pressure in chamber 33 does not offer significant resistance because of a check valve 71 in the piston C. The check valve has a flat disk portion 72 which acts to cover openings 73. Upon manually produced movement of the power piston C downwardly, the pressure in chamber 33 increases, and causes the flat disk portion 72 to flex and expose the openings 73. As a result, air from chamber 33 escapes to the chamber 32 and the piston C may be moved downwardly.

It will be noted that in the power application of brakes with the described power brake unit, manual effort is used solely to actuate the valve assembly E and unlike many of the power brakes now in use, manual effort is not used to supplement the brake output. It is unnecessary to have mechanical connections between the manual input member B and the power piston C so that brake output results solely from the pressure acting on the power piston C and is directly proportional thereto.

Also, it will be noted that only two dynamic seals 25 and 31 are required. The dynamic seals 25 associated with manual member B and 31 associated with the power piston C greatly reduce the friction which must be overcome to afford braking. As a consequence, brake output can be accomplished almost simultaneously with the initiation of pedal movement. In the devices presently in use, it is necessary to overcome a great number of frictional forces before any braking effort can be accomplished. Furthermore, the frictional resistances must be accommodated to accomplish complete release of the brakes.

The significance of friction and the performance of the present invention will be more apparent from an examination of the graph in FIGURE 2 in which the abscissa represents the manual force or input applied by an operator on the brake pedal and the ordinate represents the output or braking force in the form of hydraulic pressure that is made available at the brakes of the vehicle. Curve F represents the relationship of manual input to brake output during application of the brakes and curve G represents the same relationship during release of the brakes. In theory, substantial portions of curves F and G are straight and parallel to each other and their spacing represents the internal friction of the power brake unit. It is desirable to maintain the spacing of the application curve F and release curve G at a minimum.

At zero pedal pressure, a minor output pressure is indicated at 81. This is a residual pressure normally provided to insure that the hydraulic system remains at a slight positive pressure to resist air leakage into the system. However, the pressure is not sufficiently high to apply any braking output at the wheels. It will be apparent that for the brakes to be completely released, the straight portion of the curve G must not intersect the ordinate above the point indicated at 81 or excessive pressure will remain in the brake system and the brakes will remain partially applied. Consequently, to insure complete release of the brakes, the unit must be so designed that the curves F and G are located a sufficient distance to the right to permit the release curve G to intersect at point 81 or below. As a consequence, the curve F is displaced to the right indicating that a certain amount of manual effort must be exerted before any brake output is accomplished. This is undesirable because the additional manual effort required does not produce a corresponding increase in brake pressure resulting in braking. This is the form of operating characteristics of most prior art power brake units.

In the disclosed power brake unit, the lack of mechanical connections between the manual input member B and the output member D and the reduction in dynamic seals so reduces the friction and resistances to the operation of the unit that the spacing of the application and the release curves is much less. In actual practice, it has been found that the spacing is a fraction of that in prior art devices and the same curve G can be used to represent the application curve and a new curve H to represent the release curve. It will be noted that the application curve G can be disposed to the left of curve F and that the initial application of the brakes can be made much sooner and with less effort than in prior art units. Furthermore, the brake output remains higher for any given input than in the prior art devices.

In FIGURE 2, the major portion of the curves have been represented as straight lines. However, for units of the type having an application curve F, the application and release curves are not necessarily straight or parallel to each other because of the variations at different points in the range of operation caused by resistances of the numerous moving seals and the mechanical connections such as levers, springs, and the like, between the manual input member and the output member. Furthermore, such resistances are sometimes erratic and may cause the curves to vary from one actuation of the brakes to another. On the other hand, during the operation of the present embodiment of the invention, the resistances are slight and relatively constant because there are no mechanical connections between the manual input member and the output member and there are only two dynamic seals. Consequently, the application and release curves remain relatively straight and constant from one application of the brakes to another.

From the foregoing description, it will be apparent that a power brake unit has been provided in which manual effort is utilized solely for actuating the valve mechanism and all of the brake output results solely from the pressure differential acting on the power piston C. Furthermore, the resistances to relative movement of parts have been minimized by utilizing only two dynamic seals and eliminating mechanical connections between the manually movable input member and the output member. Because of the lack of mechanical connections, the manual input and the braking output remain directly proportional to the pressure and, consequently, to each other over the entire range of braking during both application and release of the brakes. In addition, the dimensions of such a unit may be kept at a minimum since the entire area within the circumference of the power piston is responsive to pressure for the purpose of applying the brakes and it is not necessary to sacrifice any portion of the area for producing the necessary reaction or feel characteristic.

It should be understood that it is not intended to limit the invention to the described forms and details and that the invention includes other forms and modifications within the scope of the appended claims.

What is claimed is:

1. A power brake mechanism comprising a housing, a movable wall in said housing acting therewith to form a variable pressure chamber at one side of said wall, a manually movable input member slidably supported in a wall of said housing for movement independently of said movable wall and presenting a pressure responsive portion in said variable pressure chamber, a source of pressure carried by said movable wall, and valve means associated with said movable wall and being operable in response to movement of said input member to admit fluid under pressure from said source to said variable pressure chamber, said movable wall and said input member being urged in different directions to each other solely in response to increase in pressure in said variable pressure chamber.

2. In a power brake mechanism having a generally cylindrical housing, a movable wall in said housing engaging the walls of the latter to form a variable pressure chamber at one side of said movable wall, a reaction piston slidably supported in an end wall of said housing for movement independently of said movable wall and having a generally circular pressure responsive portion in said variable pressure chamber facing said movable wall in spaced relation thereto, a supply member connected to said movable wall and presenting a source of fluid under relatively high pressure, valve means movable in response to movement of said piston to admit fluid under pressure from said supply member to said variable pressure chamber for moving said movable wall in one direction, said pressure responsive portion being smaller in diameter than said movable wall whereby an increase in pressure in said variable pressure chamber urges said piston in a direction opposite to said one direction of movement of said wall and with a force directly proportional to but less than the force moving said wall.

3. A power brake mechanism comprising a generally cylindrical housing, a movable wall in said housing acting therewith to form a variable pressure chamber at one side of said wall, said movable wall presenting a first pressure responsive surface defined by the entire area within the circumference of said movable wall, said housing having an end wall, a manually movable input member slidably supported in said end wall in axially spaced relation to and for movement independently of said movable wall, said input member presenting a second pressure responsive portion in said variable pressure chamber smaller than said first pressure responsive surface, a supply member connected to said movable wall and presenting a source of pressure communicating with said variable pressure chamber, and valve means associated with said movable wall and being operable in response to movement of said input member to admit fluid under pressure to said variable pressure chamber, said movable wall being urged in a first direction to exert a force proportional to said first pressure responsive portion and said input member being urged in a second direction with a reaction force proportional to said second pressure responsive portion upon an increase in pressure in said variable pressure chamber.

4. In a power brake mechanism, a housing, a movable wall in said housing acting with the latter to form a chamber, said movable wall presenting a first pressure responsive portion in said chamber, a manually movable input member axially spaced from said wall and presenting a second pressure responsive surface in said chamber, a supply passage in said first portion communicating with said chamber and with a source of fluid under pressure, an exhaust passage in said second portion communicating with said chamber and with the atmosphere, valve means carried by said wall and including a supply valve element normally closing said supply passage and an exhaust valve element spaced from said second portion to maintain said exhaust passage open, said supply and exhaust valve elements being movable as a unit relative to said wall upon movement of said input member to close said exhaust passage and open said supply passage to increase the pressure in said variable pressure chamber, said input member and wall being urged axially away from each other solely in response to an increase in pressure in said variable pressure chamber.

5. A power brake mechanism for actuating a hydraulic brake master cylinder, said mechanism including a housing having an end wall, a pressure responsive wall movably supported in said housing and forming a variable volume chamber in said housing, a piston member slidably supported in said end wall in axially spaced relation to said pressure responsive wall for movement independently of the latter, valve means carried by said pressure responsive wall and including a supply member connected to said pressure responsive wall and presenting a supply valve element and exhaust valve element movable as a unit, a source of fluid under pressure, a supply valve seat in said movable wall between said source and said chamber, an exhaust valve seat in said piston member between said chamber and the atmosphere, said piston member being movable independently of said pressure responsive wall to move said exhaust seat into engagement with said exhaust valve element and said supply seat out of engagement with said supply valve element while maintaining said piston member and movable wall in axially spaced relation to admit fluid under pressure to said chamber and urge said piston member and movable wall axially in opposite directions from each other solely in response to pressure in said chamber.

6. In a power brake mechanism having a housing, power piston means movably supported in said housing and forming a variable pressure chamber in one end of the latter, an output member connected to said power piston means for movement therewith, reaction piston means supported in said housing for movement independently of said power piston and having a pressure responsive portion in said variable pressure chamber, a manual input member connected to said reaction piston for movement therewith, supply passage means in said power piston means communicating with said variable pressure chamber and with a source of fluid under pressure, exhaust passage means in said reaction piston means communicating with said variable pressure chamber and with the atmosphere, valve means movably mounted on said power piston means and normally positioned to close said supply passage means, said reaction piston means being movable in response to manual movement of said input member to engage said valve means to close said exhaust passage means and open said supply passage means to increase the pressure in said variable pressure chamber, said power piston means moving said output member in one direction and said reaction piston urging said input member in the opposite direction solely in response to an increase in pressure in said variable pressure chamber.

7. In a power braking mechanism having a housing and a movable wall in said housing acting with the latter to form a first fluid pressure chamber and a second fluid pressure chamber at opposite sides of said wall each normally containing fluid under the same relatively low pressure, a manually movable input member slidably supported in said housing for movement independently of said wall and presenting a pressure responsive portion in said first chamber, an output member connected to one side of said wall for movement therewith and being disposed in said second chamber, said output member forming a supply chamber for containing a supply of relatively high pressure fluid, supply passage means between said supply chamber and said first chamber, exhaust passage means in said pressure responsive portion communicating said first chamber with the atmosphere, follow up valve means including a supply vlave element adapted to close said supply passage means and an exhaust valve element adapted to close said exhaust passage means, said valve elements being connected together for movement as a unit, said input member being engagable with said exhaust valve element to close the latter and to open said supply valve element upon manual movement of said input member to place said first chamber in communication with said supply chamber, said wall and input member being urged in opposite directions in responsive to an increase in pressure in said first chamber.

8. A power brake mechanism comprising a housing, a movable wall member in said housing forming a variable pressure chamber therewith at one side of said wall, a supply chamber connected the other side of said wall and communicating with said variable pressure chamber, means for supplying fluid under pressure to said supply chamber, valve means movably supported in said wall and including a supply valve element normally closing communication between said supply chamber and said variable pressure chamber, a manually movable input member axially spaced from said movable wall for movement independently thereof and having a pressure responsive portion in said variable pressure chamber, an exhaust valve seat formed in said pressure responsive portion and placing said variable pressure chamber in communication with the atmosphere, said valve means including an exhaust valve element connected to said supply valve element for movement therewith and normally being spaced from said exhaust valve seat to permit communication of said variable pressure chamber with the atmosphere, said exhaust valve seat being movable into engagement with said exhaust valve element to close communication between said variable pressure chamber and the atmosphere and to move said supply valve element to place said variable pressure chamber and supply chamber in communication with each other to increase the pressure in said variable pressure chamber, said input member and said wall being urged in opposite directions from each other in response to an increase in pressure in said variable pressure chamber.

References Cited in the file of this patent

UNITED STATES PATENTS

| | | |
|---|---|---|
| 2,779,314 | Vorech | Jan. 29, 1957 |
| 2,883,970 | Stelzer | Apr. 28, 1959 |
| 2,883,971 | Ayers | Apr. 28, 1959 |
| 2,997,028 | Ayers | Aug. 22, 1961 |
| 3,076,441 | Ayers | Feb. 5, 1963 |
| 3,093,119 | Stelzer | June 11, 1963 |

UNITED STATES PATENT OFFICE
CERTIFICATE OF CORRECTION

Patent No. 3,151,530                      October 6, 1964

Curtis L. Brown

It is hereby certified that error appears in the above numbered patent requiring correction and that the said Letters Patent should read as corrected below.

Column 7, lines 59 to 61, strike out "member connected to said pressure responsive wall and presenting a supply"; same column 7, line 62, after "unit," insert -- a supply member connected to said pressure responsive wall and presenting --; column 8, line 53, for "responsive" read -- response --; line 57, after "connected" insert -- to --.

Signed and sealed this 9th day of February 1965.

(SEAL)
Attest:

ERNEST W. SWIDER
Attesting Officer

EDWARD J. BRENNER
Commissioner of Patents